US010387028B2

(12) United States Patent
Matsumoto et al.

(10) Patent No.: US 10,387,028 B2
(45) Date of Patent: Aug. 20, 2019

(54) VEHICLE OPERATION DEVICE AND VEHICLE OPERATION METHOD

(75) Inventors: Koichi Matsumoto, Toyota (JP); Noriyo Inagaki, Anjo (JP); Naoe Kanetsuki, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 1072 days.

(21) Appl. No.: 14/127,661

(22) PCT Filed: Jun. 26, 2012

(86) PCT No.: PCT/IB2012/001265
§ 371 (c)(1),
(2), (4) Date: Dec. 19, 2013

(87) PCT Pub. No.: WO2013/001340
PCT Pub. Date: Jan. 3, 2013

(65) Prior Publication Data
US 2014/0123064 A1 May 1, 2014

(30) Foreign Application Priority Data
Jun. 29, 2011 (JP) .................................. 2011-144745

(51) Int. Cl.
G06F 3/0488 (2013.01)
B60K 35/00 (2006.01)
(Continued)

(52) U.S. Cl.
CPC ....... G06F 3/0488 (2013.01); B60H 1/00985 (2013.01); B60K 35/00 (2013.01); G06F 3/0482 (2013.01); G06F 3/04886 (2013.01); B60K 2350/1028 (2013.01); B60K 2350/1068 (2013.01)

(58) Field of Classification Search
None
See application file for complete search history.

(56) References Cited

U.S. PATENT DOCUMENTS 8,676,270 B2 * 3/2014 Ukai ................... H04M 1/7253
455/566
8,947,454 B2 * 2/2015 Hashikawa ............ B60K 35/00
340/425.5

(Continued)

FOREIGN PATENT DOCUMENTS

EP 1 762 419 A1 3/2007
EP 2181881 A1 5/2010
(Continued)

Primary Examiner — Yongjia Pan
(74) Attorney, Agent, or Firm — Sughrue Mion, PLLC

(57) ABSTRACT

A vehicle operation device includes a touch operation display (10); a presentation display (20) that is arranged farther from a driver's seat than the touch operation display and that displays a plurality of information items; and a processing device (30) that, in response to a predetermined selection operation on the touch operation display (10), erases a display of one information item, selected from the plurality of information items displayed on the presentation display (20), from a screen on the presentation display (20) and that displays an operation screen, corresponding to the erased information item, on the touch operation display (10).

16 Claims, 5 Drawing Sheets

(51) Int. Cl.
    *G06F 3/0482*  (2013.01)
    *B60H 1/00*    (2006.01)

(56) References Cited

U.S. PATENT DOCUMENTS

| | | | |
|---|---|---|---|
| 2003/0025678 A1* | 2/2003 | Lee .................... | G06F 3/038 345/173 |
| 2007/0061068 A1* | 3/2007 | Okamoto ............ | B60K 35/00 701/532 |
| 2007/0198948 A1* | 8/2007 | Toriyama ............ | A63F 13/005 715/790 |
| 2008/0211832 A1 | 9/2008 | Kumon | |
| 2011/0227843 A1* | 9/2011 | Wang .................. | B60R 25/00 345/173 |
| 2013/0106750 A1* | 5/2013 | Kurosawa ............ | G06F 3/041 345/173 |
| 2014/0092047 A1* | 4/2014 | Nara ................... | G01C 21/3688 345/173 |

FOREIGN PATENT DOCUMENTS

| | | |
|---|---|---|
| JP | 11-142171 A | 5/1999 |
| JP | 2007-069676 A | 3/2007 |

\* cited by examiner

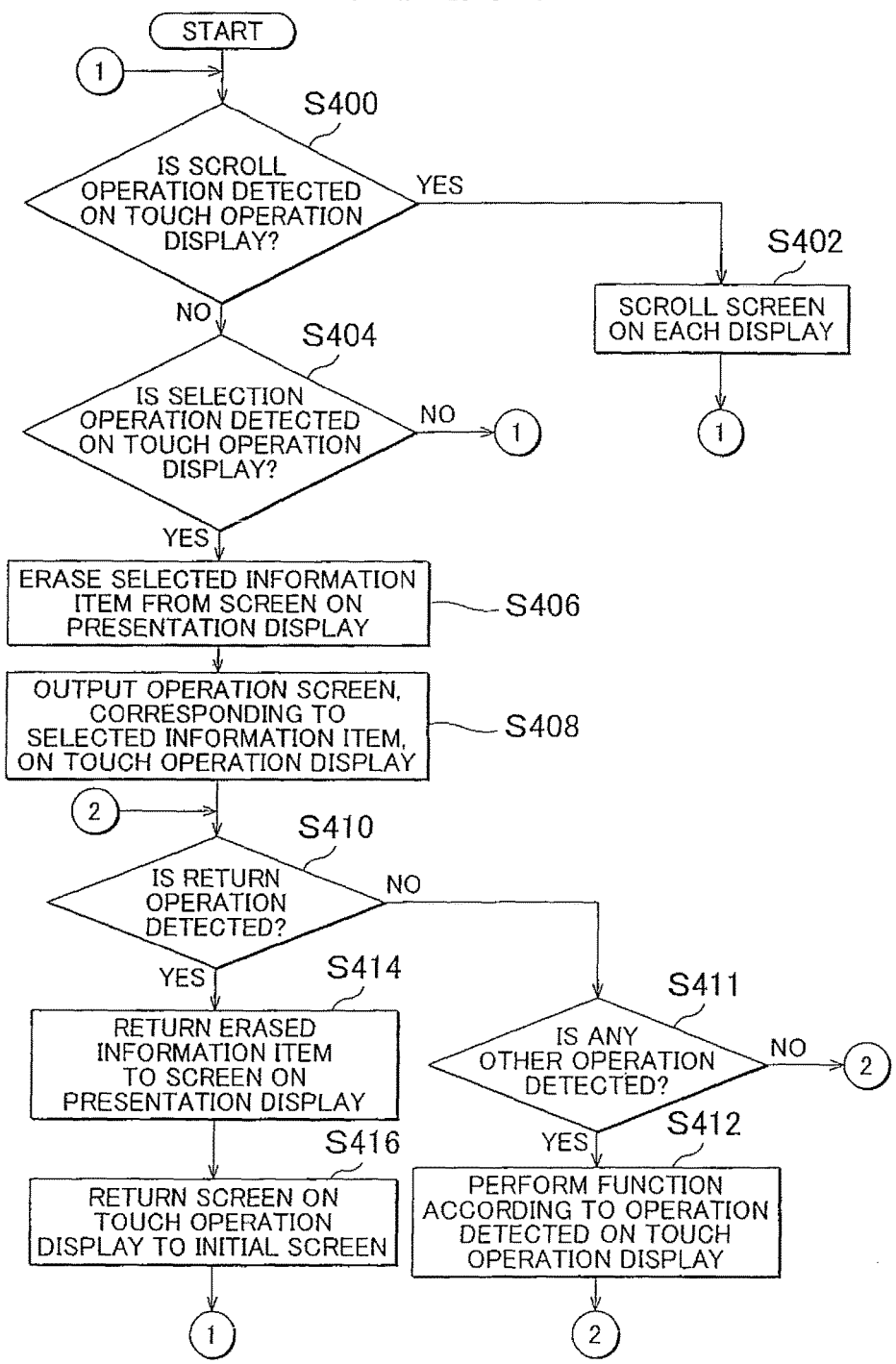

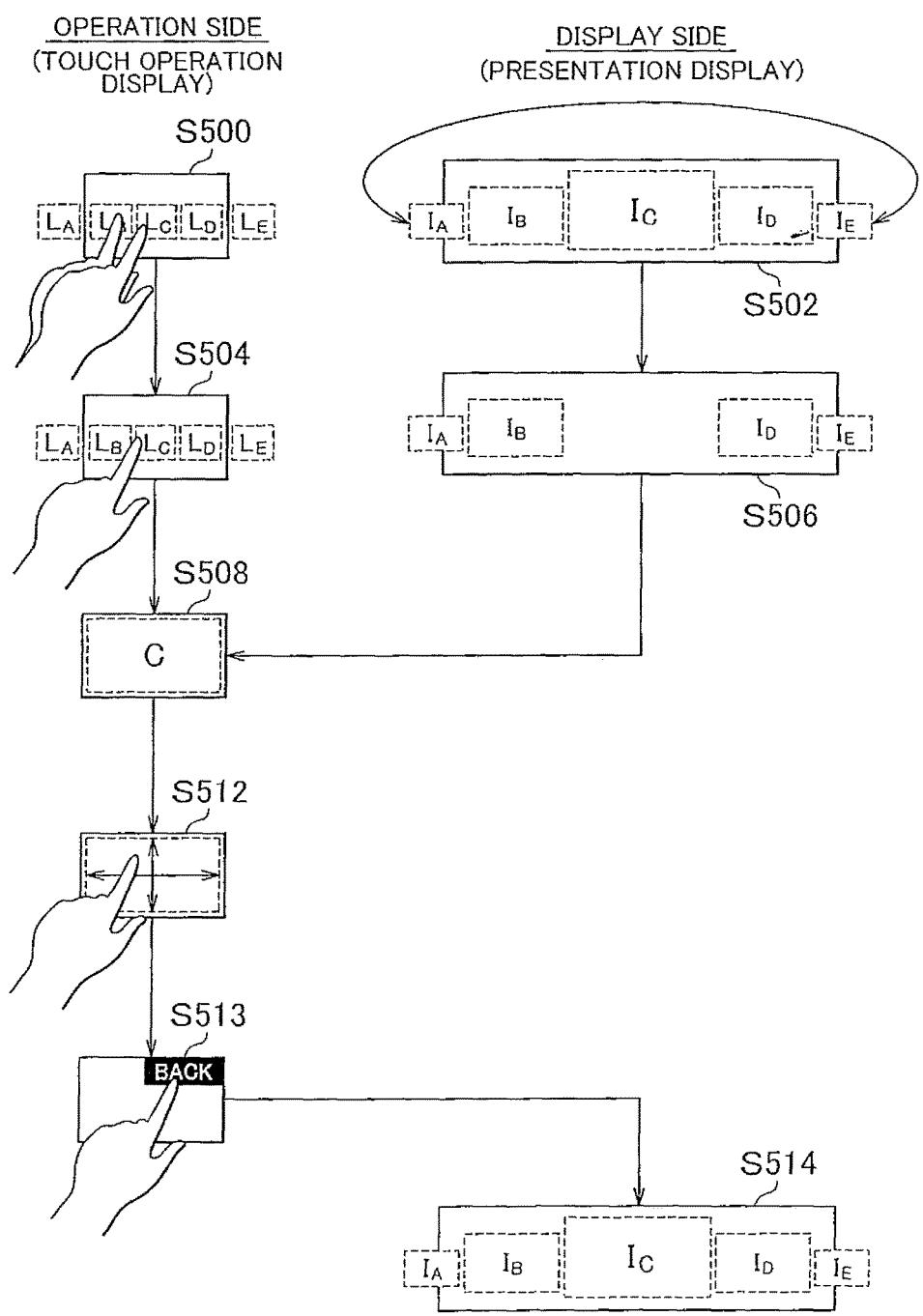

VEHICLE OPERATION DEVICE AND VEHICLE OPERATION METHOD

BACKGROUND OF THE INVENTION

1. Field of the Invention

The present invention relates to a vehicle operation device and a vehicle operation method that use two displays.

2. Description of Related Art

Conventionally, a vehicle operation device is known that has an operation unit, on which the operation switches are provided, and a display unit on which the operation menu image is displayed to indicate the layout of the operation switches on the operation unit and their functions. These two units are provided in physically separate positions in the vehicle interior (for example, see Japanese Patent Application Publication No. 2007-69676 (JP 2007-69676 A)). This vehicle operation device images the user's hand, with which to operate the operation unit, with a camera and superimposes the image of the hand on the operation menu image on the display unit, allowing the user to perform operation on the vehicle-mounted devices, without having visual contact with the devices.

In general, the vehicle operation device is configured in such a way that the operation unit is provided in a position closer to the driver's seat (on the driver's side), and the display unit in a position farther from the driver's seat (on the vehicle's front side), to ensure safety. This configuration allows the user to operate the operation unit provided on the driver's side while viewing the display unit provided on the vehicle's front side. On the other hand, in such a configuration where the operation unit and the display unit are provided in physically different positions, it is preferable that sense of unity between the operation unit and the display unit be given while maintaining relationship between the display corresponding to operation unit and the display on the display unit.

In this respect, the vehicle operation device, such as the one described in Japanese Patent Application Publication No. 2007-69676 given above, images the image of the user's hand, with which to operate the operation unit, with a camera and displays the image on the display unit. Therefore, this vehicle operation device maintains relationship in the displays and sense of unity between the operation unit and the display unit via the image of the user's hand though these two units are provided in separate positions. However, it is usually difficult to achieve the sense of unity between the operation unit and the display unit in a configuration where the image of a hand, such as the one described above, is not used. For example, simply displaying the same screen with respect to both the operation unit and the display unit in synchronization mode (dual display) does not fully achieve the sense of unity between the operation unit and the display unit. In such a dual display configuration where the user performs operation while viewing the operation unit, the display on the display unit changes according to an operation on the operation unit. This requires the user (driver) to pay attention also to the display unit, decreasing the operability on the operation unit.

SUMMARY OF THE INVENTION

The present invention provides a vehicle operation device and a vehicle operation method that efficiently maintains the relationship in displays and the sense of unity between the operation unit and the display unit, in a configuration where the operation unit and the display unit are provided in physically different positions.

According to a first aspect of the present invention, a vehicle operation device includes a touch operation display; a presentation display that is arranged farther from a driver's seat than the touch operation display and that displays a plurality of information items; and a processing device that, in response to a predetermined selection operation on the touch operation display, erases a display of one information item, selected from the plurality of information items displayed on the presentation display, from a screen on the presentation display and that displays an operation screen, corresponding to the erased information item, on the touch operation display.

According to a second aspect of the present invention, a vehicle operation device includes a touch operation panel; a first display that is arranged farther from a driver's seat than the touch operation panel and that displays a plurality of information items; a second display that is arranged near the touch operation panel; and a processing device that, in response to a predetermined selection operation on the touch operation panel, erases a display of one information item, selected from the plurality of information items displayed on the first display, from a screen on the first display and that displays an operation screen, corresponding to the erased information item, on the second display.

According to a third aspect of the present invention, a vehicle operation method includes, in response to a predetermined selection operation on a touch operation display, erasing a display of one information item, selected from a plurality of information items displayed on a presentation display, from a screen on the presentation display; and displaying an operation screen, corresponding to the erased information item, on the touch operation display, wherein the presentation display is arranged farther from a driver's seat than the touch operation display.

According to a fourth aspect of the present invention, a vehicle operation method includes, in response to a predetermined selection operation on a touch operation panel, erasing a display of one information item, selected from a plurality of information items displayed on a first display, from a screen on the first display; and displaying an operation screen, corresponding to the erased information item, on a second display, wherein the first display is arranged farther from a driver's seat than the touch operation panel, and wherein the second display is arranged near the touch operation panel.

The configuration described above efficiently maintains the relationship in displays and the sense of unity between the operation unit and the display unit, in a configuration where the operation unit and the display unit are provided in physically different positions.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a flowchart showing an example of the main processing performed by a processing device 30;

FIG. 5 is a diagram showing an example of the status of screens (changes in screens) displayed on the touch operation display 10 and the presentation display 20 related to the processing shown in FIG. 4.

DETAILED DESCRIPTION OF EMBODIMENTS

An embodiment of the present invention will be described below with reference to the drawings.

Figure 1:
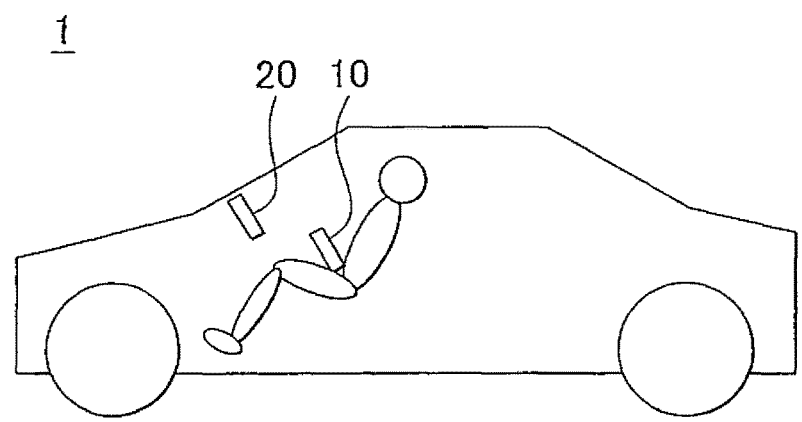
FIG. 1 is a general diagram showing an example of the arrangement of two displays, 10 and 20, of a vehicle operation device 1 in a vehicle.
Figure 2:
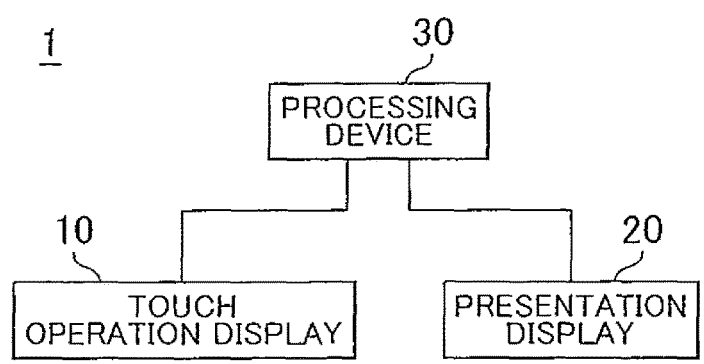
FIG. 2 is a block diagram showing the main configuration of the vehicle operation device 1 in one embodiment of the present invention.

FIG. 1 is a general diagram showing an example of the arrangement of two displays 10 and 20 of a vehicle operation device 1 mounted in a vehicle. FIG. 2 is a block diagram showing the main configuration of the vehicle operation device 1 in the embodiment.

As shown in FIG. 2, the vehicle operation device 1 includes a touch operation display 10, a presentation display 20, and a processing device 30.

The touch operation display 10 has the display function as well as the function to detect a user's (for example, driver's) touch operation. Any touch operation detection mode, for example, pressure-sensitive and electrostatic, may be used. The touch operation may be performed by a finger or an instrument such as a pen (stylus). The touch operation display 10 may be a fixed device fixed to the vehicle interior, or a portable device brought into the vehicle interior by the user.

The presentation display 20 is configured by any display such as a liquid crystal display. The presentation display 20 may be a display having only the display function (that is, a display on which the touch operation cannot be performed) or a display, similar to the touch operation display 10, on which the touch operation can be performed.

The touch operation display 10 and the presentation display 20 are arranged in different positions in the vehicle interior. The touch operation display 10 is arranged in a position closer to the user (especially, the driver) than the presentation display 20. More specifically, the touch operation display 10 is arranged in a position where the user can operate it easily, preferably in a position close enough for the driver to operate it simply by extending his or her hand, as shown in FIG. 1. For example, the touch operation display 10 may be arranged either in the center console section or on the instrument panel. On the other hand, the presentation display 20 is arranged in a position where the user can view it easily, preferably in a position where the driver can view it without having to largely change the viewing field during driving. For example, the presentation display 20 may be arranged in the center of the top of the instrument panel. The screen of the presentation display 20 may be larger than the screen of the touch operation display 10.

The processing device 30 is connected to the touch operation display 10 and the presentation display 20 as shown in FIG. 2. The processing device 30 may be connected, directly or indirectly, to the touch operation display 10 and the presentation display 20 either wirelessly or via a wire line. The processing device 30 performs the generation (drawing) processing and the output processing for a screen (output image or output video) displayed on the touch operation display 10 and the presentation display 20. The processing device 30 also performs processing for implementing various functions according to various operations on the touch operation display 10. The processing device 30 may include, for example, a graphic board or a drawing IC to perform various types of processing for generating and outputting various screens displayed on the touch operation display 10 and the presentation display 20. In addition, the processing device 30 may include, for example, a microcomputer or a digital signal processor (DSP) to generate and output operation signals according to various operations on the touch operation display 10. The function of the processing device 30 may be implemented by one dedicated processing device or by the cooperation of multiple processing devices located at different locations. For example, the function of the processing device 30 may be implemented, in part or in whole, by the navigation device ECU or the air conditioner ECU. The function of the processing device 30 may be included, in part or in whole, in the touch operation display 10 and/or presentation display 20.

Figure 3A:
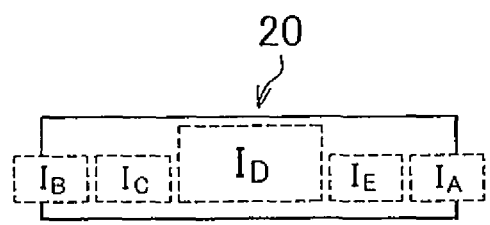
FIGS. 3A and 3B are diagrams showing an example of the relation between the screen displayed on the presentation display 20 and the screen displayed on the touch operation display 10.
Figure 3B:
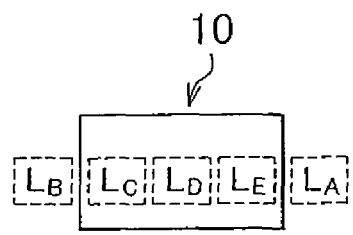

FIGS. 3A and 3B are diagrams showing an example of the relation between the screen displayed on the presentation display 20 and the screen displayed on the touch operation display 10. FIG. 3A is a diagram showing an example of the screen of the presentation display 20, and FIG. 3B is a diagram showing an example of the initial screen of the touch operation display 10.

The presentation display 20 displays multiple information items that can be operated on the touch operation display 10. In the example shown in FIG. 3A, five information items $I_A$, $I_B$, $I_C$, $I_D$, and $I_E$ are displayed horizontally in a row on the presentation display 20. In this example, a part of the information items at both ends, $I_A$ and $I_B$, is invisible because they are halfway out of the screen of the presentation display 20. Although the information items $I_A$, $I_B$, $I_C$, $I_D$, and $I_E$ are arranged and displayed as shown in the figure in this example, any number of information items may be displayed in any arrangement. For example, multiple information items may be displayed vertically or horizontally or in a combination of vertical and horizontal arrangements on the screen, or may be displayed in random positions on the screen. In the example shown in FIG. 3A, though the information items $I_A$ and $I_B$ at both ends of the presentation display 20 are displayed only partially on the presentation display 20 because of the limit on the screen size of the presentation display 20, the information items $I_A$ and $I_B$ may be displayed in their entirety or, conversely, may not be displayed at all. In the example shown in FIG. 3A, the most central information item $I_D$ on the presentation display 20 is displayed most largely, the outer information items $I_C$ and $I_E$ are displayed smaller, and the still outer information items $I_B$ and $I_A$ are displayed still smaller to give the impression of depth on the screen. That is, this display method gives the impression of depth in such a way that the most central information item $I_D$ on the presentation display 20 is displayed in the front of the others (on the user side) with the outer information items behind it.

The information items may include items corresponding to various functions that can be performed on the touch operation display 10. For example, an information item corresponds to the audio function, TV function, air conditioning function, navigation function, and mail function. The information items may also include items corresponding to various types of information that can be displayed on the touch operation display 10. For example, an information item corresponds to travel information, such as fuel consumption, or entertainment information.

An information item may be displayed as an icon on the presentation display 20. In this case, a pictogram or text (description), which indicates the associated function, may be given to the icon. For example, a pictogram or text may be given to an icon to indicate what operation the user will be able to perform (what function will be able to be performed) on the touch operation display 10 when the user selects the icon. Also, a pictogram or text may be given to an icon to indicate what information the user will be able to view on the touch operation display 10 when the user selects the icon.

For example, in the example shown in FIG. 3A, the information item $I_A$ may be associated with the TV function, in which case the text "TV" is displayed on the icon associated with the information item $I_A$. Instead of the text "TV", the video of the currently selected TV broadcast may be displayed on the icon associated with the information item $I_A$. The information item $I_B$ may be associated with the audio function, in which case the text "Audio" is displayed on the icon associated with the information item $I_B$. Instead of the text "Audio", the graphic display indicating the status of the currently played-back music (song title or track number) may be displayed on the icon associated with the information item $I_B$. The information item $I_C$ may be associated with the air conditioning function, in which case the text "Air conditioning setting" is displayed on the icon associated with the information item $I_C$. Instead of the text "Air conditioning setting", the graphic display indicating the current air conditioner status (setting temperature, blower air flow) may be displayed on the icon associated with the information item $I_C$. The information item $I_D$ may be associated with the vehicle navigation function, in which case the text "Navigation screen" is displayed on the icon associated with the information item $I_D$. Instead of the text "Navigation screen", the map of the surrounding area of the vehicle's current position may be displayed on the icon associated with the information item $I_D$. The information item $I_E$ may be associated with the function to display the travel information such as fuel consumption, in which case the text "Travel information" is displayed on the icon associated with the information item $I_E$. Instead of the text "Travel information", a part of the travel information may be displayed on the icon associated with the information item $I_E$-Any information may be displayed in the display area other than the information item display area on the screen of the presentation display 20. For example, a predetermined background image (moving image or still image) may be displayed. As the moving image, the ambient image behind the vehicle, which is imaged by the backward monitoring camera in real time, may be displayed. As the still image, an image of predetermined color or a wallpaper image used on a PC may be displayed.

The launcher items, corresponding to the information items displayed on the presentation display 20, are displayed on the touch operation display 10. The launcher items may be displayed in the same arrangement as that of the information items on the presentation display 20. In the example shown in FIG. 3B, three launcher items, $L_C$, $L_D$, and $L_E$, are displayed on the touch operation display 10. In FIG. 3B, the launcher items $L_A$ and $L_B$, though not actually displayed on the touch operation display 10, are shown outside the touch operation display 10 to indicate the arrangement order of the launcher items. The three launcher items, $L_C$, $L_D$, and $L_E$, correspond to the central three information items $I_C$, $I_D$, and $I_E$, on the presentation display 20 shown in FIG. 3A. Because the most central information item on the presentation display 20 is the information item $I_D$, the most central launcher item on the touch operation display 10 is the launcher item $L_D$. Although five launcher items $L_A$, $L_B$, $L_C$, $L_D$, and $L_E$ corresponding to five information items $I_A$, $I_B$, $I_C$, $I_D$, and $I_E$ are shown in this example, any number of launcher items may be displayed in any arrangement as long as the number and the arrangement of the launcher items correspond to those of the information items. In the example shown in FIG. 3B, though the launcher items $L_A$ and $L_B$ are not displayed on the touch operation display 10 because of the limit on the screen size of the touch operation display 10, the launcher items $L_A$ and $L_B$ may be displayed partially or in their entirety.

Like an information item on the presentation display 20, a launcher item may be displayed as an icon on the touch operation display 10. In this case, a pictogram or text (description), which indicates the associated function, may be given to the icon. The pictogram or text (description) given to an icon may be the same as, or different from, the pictogram or text given to an information item on the presentation display 20. For example, when the screen size of the touch operation display 10 is smaller than the screen size of the presentation display 20, the amount of information given to an icon associated with a launcher item may be smaller than the amount of information given to the icon associated with the corresponding information item.

Figure 6:
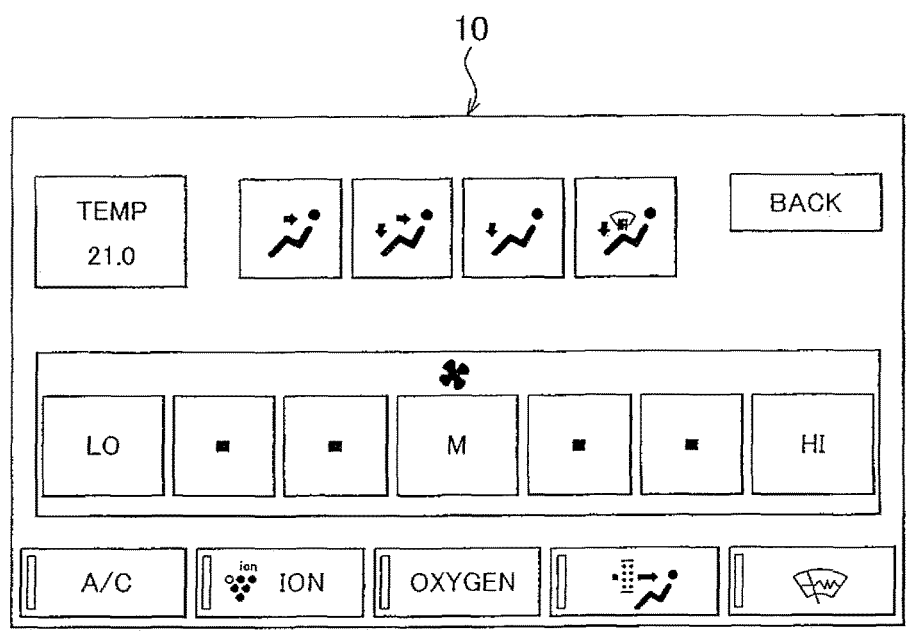
FIG. 6 is a diagram showing an example of the operation screen on the touch operation display 10 when the launcher item $L_C$ is selected.

FIG. 4 is a flowchart showing an example of the main processing performed by the processing device 30. FIG. 5 is a description diagram related to the processing shown in FIG. 4. The figure shows an example of the screens (changes in screens) displayed on the touch operation display 10 and the presentation display 20 when the processing in FIG. 4 is performed FIG. 5 shows the screens of the touch operation display 10 in the left half of the figure, and the screens of the presentation display 20 in the right half. FIG. 6 is a diagram showing an example of the operation screen displayed on the touch operation display 10 when the launcher item $L_C$ is selected.

The following describes the flowchart in FIG. 4 with reference to FIG. 5 and FIG. 6. The processing routine shown in FIG. 4 is started, for example, when the ignition switch is turned on. After that, the processing routine is executed repeatedly at periodic intervals until the ignition switch is tuned off. When the processing routine shown in FIG. 4 is started (initial state), the screen such as the one shown in FIG. 3A is displayed on the presentation display 20 and, corresponding to that screen, the initial screen such as the one shown in FIG. 3B is displayed on the touch operation display 10. The information item, positioned in the most central position at start time (information item $I_D$ in the example shown in FIG. 3A), may be an information item that is set by default or an information item that is set by the user. In addition, the information item, positioned in the most central position at start time, may be an information item positioned in the most central position when the processing ended last or may be the most frequently used information item identified through learning from the past operations.

In step 400, the processing routine determines whether the scroll operation is detected on the touch operation display 10. The scroll operation may be an operation for scrolling the screen on the presentation display 20 and, correspondingly, the screen on the touch operation display 10, both in the horizontal direction of the screen. If the scroll operation is detected on the touch operation display 10, the processing proceeds to step 402. If the scroll operation is not detected, the processing proceeds to step 404.

In step 402, in response to the scroll operation on the touch operation display 10, the screen on the presentation display 20 is scrolled and, at the same time, the screen on the touch operation display 10 is scrolled correspondingly. For example, when the user moves his or her finger on the touch operation display 10 from left to right as schematically shown by the movement of the hand in S500 in FIG. 5, the screen on the presentation display 20 is scrolled right and the screen shown in FIG. 3A changes to the screen shown in S502 in FIG. 5. Corresponding to this scroll operation, the screen on the touch operation display 10 is scrolled right, and the screen shown in FIG. 3B changes to the screen shown in S500 in FIG. 5. The scroll amount may be changed according to the movement amount or the movement speed of the finger on the touch operation display 10. When the processing according to this scroll operation is terminated, the processing returns to step 400 to perform processing in the next period.

In this way, while viewing the screen on the presentation display 20 provided on the front side, the user can perform the scroll operation on the touch operation display 10 to move a desired information item to the position on the presentation display 20 where the user can select it.

In step 404, the processing routine determines whether or not the launcher item selection operation is performed on the touch operation display 10. The selection operation refers to an operation in which the user selects one desired launcher item from the multiple selectable launcher items on the touch operation display 10. The selection operation can be performed in one of the following two ways. In one way, the user touches a launcher item, which the user wants to select, on the touch operation display 10. In another way, the user moves a launcher item, which the user wants to select, on the touch operation display 10 into the downward direction of the screen while touching the launcher item (in other words, the user performs the drag operation in the downward direction). In the latter operation, the user feels as if the user brought (moved) a particular information item on the presentation display 20 into the touch operation display 10 as will be described later (see S506 and S508 in FIG. 5). If the launcher item selection operation is detected on the touch operation display 10, the processing proceeds to step 406; if the selection operation is not detected, the processing returns to step 400 to perform processing in the next period.

A selectable launcher item on the touch operation display 10 is any one of the launcher items displayed on the touch operation display 10 when the selection operation is performed. For example, on the screen shown in S500 in FIG. 5, any one of the launcher items $L_B$, $L_C$, and $L_D$ is selectable. Instead of this, a selectable launcher item on the touch operation display 10 may also be only the launcher item corresponding to the information item in the most central position of the screen of the presentation display 20 when the selection operation is performed (information item $I_C$ on the screen shown in S502 in FIG. 5). In this case, wherever the user performs the selection operation (for example, the drag operation in the downward direction) on the touch operation display 10, the information item positioned in the most central position bn the screen of the presentation display 20 at that time is selected. This configuration eliminates the need for the user to view the touch operation display 10 but allows the user to select a desired launcher item simply by viewing the screen of the presentation display 20. This means that the launcher items need not be displayed on the touch operation display 10.

In step 406, in response to the launcher item selection operation on the touch operation display 10, the information item corresponding to the launcher item, selected on the touch operation display 10, is erased from the screen on the presentation display 20. For example, when the launcher item $L_C$ is selected in the example shown in FIG. 5 (see S504), the screen on the presentation display 20 changes from the screen shown in S502, in which the information item $I_C$ is included, to the screen shown in S506 in which the information item $I_C$ is not included.

It is also possible in step 406 that the screen on the presentation display 20 is first scrolled to move the information item, corresponding to the selected launcher item, to the most central position of the screen and, then, the information item corresponding to the launcher item, selected on the touch operation display 10, is erased from the screen on the presentation display 20 (in this case, the scroll operation and the erase operation may also be performed either in reverse or at the same time). This processing may also be performed when an information item, other than the one in the most central position of the screen on the presentation display 20, is selected.

In step 408, in response to the launcher item selection operation on the touch operation display 10, the launcher item (for example, corresponding application) selected on the touch operation display 10 is started. As a result, the operation screen corresponding to the selected launcher item (that is, the selected information item) is output to, and displayed on, the touch operation display 10. This processing in step 408, combined with the processing in step 406 described above, makes the user feel as if the information item, selected on the presentation display 20, moved to the touch operation display 10, thus increasing the sense of unity between the touch operation display 10 and the presentation display 20 (that is, the user feels as if one operation device was implemented by two displays).

In this case, the display of the operation screen on the touch operation display 10, corresponding to the selected information item, may substantially be the same as the display of the selected information item on the presentation display 20 (except the size and the display of the switches (keys) that will be described later) (see S508 in FIG. 5). It should be noted that the operation screen on the touch operation display 10 is preferably a screen for performing an operation. For example, when the launcher item $L_D$ is selected with the map of the surrounding area of the vehicle's current position displayed on the icon of the information item $I_D$ on the presentation display 20, the map display displayed on the presentation display 20 at that time may substantially and directly be displayed on the touch operation display 10. In this case, the user can perform the scroll operation on the touch operation display 10 to scroll the map display. Also, when the launcher item $L_E$ is selected with the travel information displayed on the icon of the information item $I_E$ on the presentation display 20, the travel information displayed on the presentation display 20 at that time may substantially and directly be displayed on the touch operation display 10. In this case, the user can perform the scroll operation on the touch operation display 10 to view other travel information or perform the touch operation on particular travel information to view the detail (for example, meter or history indicating the real-time fuel efficiency).

Alternatively, the operation screen on the touch operation display 10, corresponding to the selected information item, may not be the same as, but may be related to, the display of the information item selected on the presentation display 20. In this case, too, it should be noted that the operation screen on the touch operation display 10 is preferably a screen for performing an operation. For example, when the launcher item $L_D$ is selected with the text "navigation screen" displayed on the icon of the information item $I_D$ on the presentation display 20, the map screen of the surrounding area of the vehicle's current position may directly be displayed on the touch operation display 10. In this case, the user can perform the scroll operation on the touch operation display 10 to scroll the map. Also, when the launcher item $L_C$ is selected with the text "air conditioning setting" displayed on the icon of the information item $I_C$ on the presentation display 20, the air conditioning setting operation screen, such as the one shown in FIG. 6, may directly be displayed on the touch operation display 10. In this case, the user can operate the switches (keys) on the touch operation display 10 to perform desired air setting. The operation screen of the touch operation display 10 may be configured by multiple layers.

In step 410, the processing routine determines whether or not the return operation is detected on the touch operation display 10. The return operation refers to an operation for returning from the state in which one desired launcher item is selected. More specifically, the return operation may be performed by the operation on the "BACK" switch (key) (see S513 in FIG. 5). The "BACK" switch (key) may be set in a predetermined position in the operation screen on the touch operation display 10. For example, on the screen shown in S513 in FIG. 5 or in the example shown in FIG. 6, the "BACK" switch (key) is configured by the switch (key) labeled "BACK" and is set at the end of the operation screen on the touch operation display 10 (upper right corner in the example in the figure). The "BACK" switch (key) may be set on the operation screen, output in step 408 described above, as an original key. The return operation may be performed by the operation of a switch (key) other than the "BACK" switch (key) or by other operations. If the return operation is detected on the touch operation display 10, the processing proceeds to step 414; if the return operation is not detected, the processing proceeds to step 411.

In step 411, the processing routine determines whether or not any other operation (that is, an operation other than return operation) is detected on the touch operation display 10. The other operations, intended for movement, selection, confirmation, change, and so on depending upon the operation screen, are the touch operation, drag operation, stroke operation, and so on (see S512 in FIG. 5). If any other operation is detected on the touch operation display 10, the processing proceeds to step 412; if any other operation is not detected, the processing returns to step 410 to perform processing in the next period.

In step 412, the function corresponding to the operation detected in step 411 described above is performed. For example, if the detected operation is the operation for air conditioner setting, the information (signal) indicating the operation contents is generated and the generated information is sent to the air conditioner or the air conditioning ECU that controls the air conditioner. For example, if an air flow or a temperature is set, the air conditioning ECU controls the blower motor (air blower), air mixing door opening degree, heater, compressor, electrically operated water pump, etc. to adjust the air flow or the temperature to the value that is set. If the detected operation is the switching (hierarchy switching) or scrolling of the operation screen, the operation screen is switched or scrolled according to the operation.

In step 414, in response to the return operation on the touch operation display 10, the processing routine returns the information item, erased in step 406 described above, to the screen on the presentation display 20. That is, the processing routine returns the state of the screen on the presentation display 20 to the state before the processing in step 406 described above is performed (see S514 in FIG. 5).

Note that, after the processing in step 406 and before the processing in step 414, the screen on the presentation display 20 remains in the state after the processing in step 406, that is, the selected information item remains erased from the screen (see S506 in FIG. 5). Therefore, during this period, a predetermined background image (moving image or still image) is output in the display area, from which the selected information item is erased on the presentation display 20, as in the area on the initial screen where information items are not displayed. This background image, an image not related to the operation screen on the touch operation display 10, does not change with the operation on the touch operation display 10 (in other words, the same screen is not displayed on both the presentation display 20 and the touch operation display 10 at the same time except at the selection operation time). This reduces the need for the user to view the presentation display 20 during the operation on the touch operation display 10 that is performed while viewing the operation screen on the touch operation display 10, ensuring good operability on the touch operation display 10.

In step 416, in response to the return operation on the touch operation display 10, the processing routine returns the screen on the touch operation display 10 from the operation screen to the initial screen. Then, the processing returns to step 400 to perform processing in the next period. The processing in step 416, combined with the processing in step 414 described above, makes the user feel as if the operation screen on the touch operation display 10 returns to the presentation display 20, thus increasing the sense of unity between the touch operation display 10 and the presentation display 20. Note that, when the operation screen returns to the initial screen in step 416, the launcher items may be arranged in any order (which launcher item is positioned in the most central position). For example, the launcher items may be arranged in the order in which the launcher items are arranged on the initial screen when the processing routine is started in FIG. 5 or in the order in which the launcher items are arranged on the initial screen displayed immediately before the screen is switched to the operation screen (screen in S504 in FIG. 5).

Note that the processing shown in FIG. 4 is configured in such a way that, once the user selects a particular launcher item, the user cannot select another launcher item unless the user performs the return operation. For example, once the user selects a particular launcher item and the selection operation is detected in S404 in FIG. 4, the user cannot select another launcher item unless the user performs the return operation to return the touch operation display 10 to the initial screen (return operation is detected in S410 and the operation in S414 and S416 is performed). As opposed to this, it is also possible to configure the processing so that, even if the operation screen is displayed on the touch operation display 10, the user can select another launcher item. To do so, a launcher change switch (key) is provided on the operation screen on the touch operation display 10 to enable the user to select another launcher item. This launcher change switch (key) may be in any form. For example, the launcher change switch (key) is a switch (key) for directly selecting another launcher item or the combination of the scroll switch (key) for scrolling the screen in S506 in FIG. 5 and the confirmation switch (key) for selecting a launcher item corresponding to the most central information item on the screen in S506 in FIG. 5. In either case, when the user selects another launcher item on the touch operation display 10, the operation screen corresponding to the selected another launcher item is displayed on the touch operation display 10. On the other hand, the information item that has been erased is returned to (see S514 in FIG. 5), and the information item corresponding to the newly selected another launcher item is erased from the screen on the presentation display 20 (see S506 in FIG. 5). In this case, the screen on the presentation display 20 may be scrolled as necessary to move the information item, corresponding to the newly selected another launcher item, to the most central position an the screen.

The vehicle operation device 1 in this embodiment, which has been described, achieves the following effect.

From the viewpoint of maintaining both visibility and operability, the vehicle operation device 1 is configured to have two displays: the presentation display 20 on the farther side and the touch operation display 10 on the closer side. First, the user selects a particular information item, displayed on the presentation display 20, through the operation on the touch operation display 10 to bring (move) the item to the touch operation display 10. Then, the user performs the operation, corresponding to the selected particular information item, on the touch operation display 10. When the operation on the touch operation display 10 is terminated, the information item returns to the presentation display 20. In this way, this configuration allows the presentation display 20 and the touch operation display 10 to work together efficiently to enhance the sense of unity. Another advantage is that the configuration of the vehicle operation device 1 prevents the same screen from being displayed on both the presentation display 20 and the touch operation display 10 at the same time during the operation on the touch operation display 10, thus maintaining high operability.

While one embodiment has been described in detail, it is apparent that the present invention is not limited by the embodiment described above and that various modifications and replacements may be added to the embodiment described above within the scope of the present invention.

For example, in the embodiment described above, the arrangement of the information items on the presentation display 20 (and, accordingly, the arrangement of the launcher items on the touch operation display 10) may be changed by the user. In addition, information items may be downloaded from an external information center to add them to, or update the contents of, the information items on the presentation display 20 (accordingly, the launcher items on the touch operation display 10). The information items (and, accordingly, the launcher items on the touch operation display 10) may also be selectively deleted by the user.

The "BACK" switch (key) on the touch operation display 10 (see S513 in FIG. 5), configured in this embodiment by the touch switch that appears when the screen moves to the operation screen, may be a dedicated switch permanently provided around the touch operation display 10. In this case, the "BACK" switch (key) may be implemented by a pressure-sensitive switch or electrostatic switch or by a switch such as a membrane switch or a tactile switch (including a push switch). The membrane switch refers to a switch that is constructed by assembling the top contact sheet and the bottom contact sheet using adhesives with an insulator (spacer) with holes between them. When the top contact sheet is pressed, the switch and the circuit are closed and current flows through the circuit.

In this embodiment described above, an information item, corresponding to a launcher item selected on the touch operation display 10, is erased completely from the screen on the presentation display 20 in response to the selection operation on the rancher item on the touch operation display 10. Instead of this, an information item may be erased in any of the other ways. For example, only the text or the pictogram inside the frame of an information item may be erased with only the frame of the information item (frame of the icon) kept and displayed. It is also possible to substantially erase an information item, corresponding to a launcher item selected on the touch operation display 10, by reducing the size to make it less conspicuous or reducing the brightness on the presentation display 20 (toned-down or deactivated). In the toned-down or deactivated configuration, the corresponding information item may be kept fixed on the presentation display 20 until the return operation is performed (that is, the information item may be fixed without synchronizing with a change in the operation screen caused by the operation on the touch operation display 10).

The vehicle operation device 1 according to the embodiment described above includes the touch operation display 10 in which an operation unit is integrated with a display unit corresponding to the operation unit. Instead of the touch operation display 10, the operation unit and the corresponding display unit separate from the operation unit may be used. That is, the vehicle operation device may include a touch operation panel and a operation display arranged near the touch operation panel. In this case, the touch operation panel and the operation display are arranged in positions closer to the user than the presentation display. Preferably, the operation display may be arranged in a position where the user can view it easily while operating the touch operation panel. In addition, the operation display may display the operation screen, initial screen and the launcher items in a similar manner as the touch operation display 10. Further, in response to the scroll operation on the touch operation panel, the screen on the operation display and the screen on the presentation display may be scrolled. The vehicle operation device using the touch operation panel and the operation display achieves the similar effect as the vehicle operation device 1 according to the embodiment described above.

The invention claimed is:

1. A vehicle operation device comprising:
   a touch operation display that displays a plurality of launcher items;
   a presentation display that is arranged farther from a driver's seat than the touch operation display and displays a plurality of information items;
   wherein each information item indicates a control function, each launcher item corresponds to one information item, and each launcher item indicates the control function associated with the corresponding information item;
   wherein an information item displayed at a center of the presentation display is displayed at a larger size than other information items, and each launcher item is displayed at a same size as other launcher items;
   a processing device that, in response to a scroll operation on the touch operation display, scrolls the plurality of launcher items displayed on the touch operation display, and scrolls the plurality of information items displayed on the presentation display, such that the plurality of launcher items and the plurality of information items are scrolled in a synchronized manner;
   wherein the processing device, in response to a selection of a launcher item among the plurality of launcher items displayed on the touch operation display:
   erases a display of an information item among the plurality of information items that corresponds to the selected launcher item and is displayed on the presentation display, from a screen on the presentation display, controls the presentation display to display information items among the plurality of information items other than the erased information item that corresponds to the selected launcher item, and displays an operation screen, corresponding to the erased information item, on the touch operation display.

2. The vehicle operation device according to claim 1, wherein in response to a predetermined return operation on the touch operation display, the processing device returns the operation screen, displayed on the touch operation display, to an initial screen and returns the display of the information item, corresponding to the operation screen, to the screen on the presentation display.

3. The vehicle operation device according to claim 2, wherein after the selection is performed and before the predetermined return operation is performed, the processing device displays a predetermined background display in an area where the erased information item was displayed on the screen on the presentation display.

4. The vehicle operation device according to claim 2, wherein the predetermined return operation is an operation on a predetermined area on the touch operation display.

5. The vehicle operation device according to claim 1, wherein the plurality of information items comprise at least two of: an audio information item, a television information item, an air conditioning information item, a navigation information item, a travel information item, and an entertainment information item.

6. The vehicle operation device according to claim 1, wherein the launcher items are displayed only on the touch operation display, and not on the presentation display.

7. A vehicle operation device comprising:

a touch operation panel;

a first display that is arranged farther from a driver's seat than the touch operation panel and displays a plurality of information items;

a second display that is arranged near the touch operation panel and displays a plurality of launcher items;

wherein each information item indicates a control function, each launcher item corresponds to one information item, and each launcher item indicates the control function associated with the corresponding information item;

wherein an information item displayed at a center of the first display is displayed at a larger size than other information items, and each launcher item is displayed at a same size as other launcher items;

a processing device that, in response to a scroll operation on the touch operation panel with an initial screen displayed on the second display, scrolls the plurality of launcher items displayed on the second display, and scrolls the plurality of information items displayed on the first display, such that the plurality of launcher items and the plurality of information items are scrolled in a synchronized manner;

wherein the processing device, in response to a predetermined selection operation on the touch operation panel:

erases a display of an information item selected from the plurality of information items displayed on the first display, from a screen on the first display, controls the first display to display information items among the plurality of information items other than the erased information item, and displays an operation screen, corresponding to the erased information item, on the second display.

8. The vehicle operation device according to claim 7, wherein in response to a predetermined return operation on the touch operation panel, the processing device returns the operation screen, displayed on the second display, to the initial screen and returns the display of the information item, corresponding to the operation screen, to the screen on the first display.

9. The vehicle operation device according to claim 8, wherein after the predetermined selection operation is performed and before the predetermined return operation is performed, the processing device displays a predetermined background display in an area where the erased information item was displayed on the screen on the first display.

10. The vehicle operation device according to claim 8, wherein the predetermined return operation is an operation on a predetermined area on the touch operation panel.

11. The vehicle operation device according to claim 7, wherein the plurality of information items comprise at least two of: an audio information item, a television information item, an air conditioning information item, a navigation information item, a travel information item, and an entertainment information item.

12. The vehicle operation device according to claim 7, wherein the launcher items are displayed only on the second display, and not on the first display.

13. A vehicle operation method comprising:

displaying a plurality of launcher items on a touch operation display;

displaying a plurality of information items on a presentation display;

wherein each information item indicates a control function, each launcher item corresponds to one information item, and each launcher item indicates the control function associated with the corresponding information item;

wherein an information item displayed at a center of the presentation display is displayed at a larger size than other information items, and each launcher item is displayed at a same size as other launcher items;

in response to a scroll operation on a touch operation display, scrolling the plurality of launcher items displayed on the touch operation display, and scrolling the plurality of information items displayed on the presentation display, such that the plurality of launcher items and the plurality of information items are scrolled in a synchronized manner;

in response to a selection of a launcher item among the plurality of launcher items displayed on the touch operation display:

erasing a display of an information item, among the plurality of information items that corresponds to the selected launcher item and is displayed on the presentation display, from a screen on the presentation display; and controlling the presentation display to display information items among the plurality of information items other than the erased information item that corresponds to the selected launcher item, and displaying an operation screen, corresponding to the erased information item, on the touch operation display, wherein the presentation display is arranged farther from a driver's seat than the touch operation display.

14. The vehicle operation method according to claim 13, wherein the launcher items are displayed only on the touch operation display, and not on the presentation display.

15. A vehicle operation method comprising:
- displaying a plurality of information items on a first display;
- displaying a plurality of launcher items on a second display;
- wherein each information item indicates a control function, each launcher item corresponds to one information item, and each launcher item indicates the control function associated with the corresponding information item;
- wherein an information item displayed at a center of the first display is displayed at a larger size than other information items, and each launcher item is displayed at a same size as other launcher items;
- in response to a scroll operation on a touch operation panel, scrolling the plurality of information items displayed on the first display, and scrolling the plurality of launcher items displayed on the second display, such that the plurality of launcher items and the plurality of information items are scrolled in a synchronized manner;
- in response to a predetermined selection operation on the touch operation panel:
  - erasing a display of an information item, selected from the plurality of information items displayed on the first display, from a screen on the first display, controlling the first display to display information items among the plurality of information items other than the erased information item, and displaying an operation screen, corresponding to the erased information item, on the second display,
- wherein the first display is arranged farther from a driver's seat than the touch operation panel, and
- wherein the second display is arranged near the touch operation panel.

16. The vehicle operation method according to claim 15, wherein the launcher items are displayed only on the second display, and not on the first display.

* * * * *